United States Patent [19]
Raby

[11] 3,796,283
[45] Mar. 12, 1974

[54] BEARING LUBRICATION SYSTEM
[75] Inventor: Virgil W. Raby, Dayton, Ohio
[73] Assignee: General Motors Corporation, Detroit, Mich.
[22] Filed: June 8, 1972
[21] Appl. No.: 261,083

[52] U.S. Cl.............................. 184/11 A, 308/127
[51] Int. Cl.............................................. F16n 7/16
[58] Field of Search........... 184/6.12, 8, 11 A, 11 R, 184/13 R, 63; 308/127, 128

[56] References Cited
UNITED STATES PATENTS
3,635,311  1/1972  Kaufman........................... 184/11 A
FOREIGN PATENTS OR APPLICATIONS
1,185,279  1/1965  Germany............................. 184/11
13,642    1/1897  Switzerland........................ 308/127
521,833   3/1921  France.............................. 184/11 R
551,800   1/1958  Canada............................. 308/127

Primary Examiner—Manuel A. Antonakas
Attorney, Agent, or Firm—F. J. Fodale

[57] ABSTRACT

A lubrication system for a bearing has a dynamic lubricator which when rotated picks up oil from a sump and delivers it to the bearing through a combination of momentum, centrifugal force and screw action. Two embodiments of a simple stamped sheet metal lubricator are disclosed for tolerating low oil levels in the sump thereby permitting a tilted orientation of the bearing housing and longer periods of time between oil replenishment. Both of the lubricators accommodate a significantly offset access to the oil sump.

5 Claims, 6 Drawing Figures

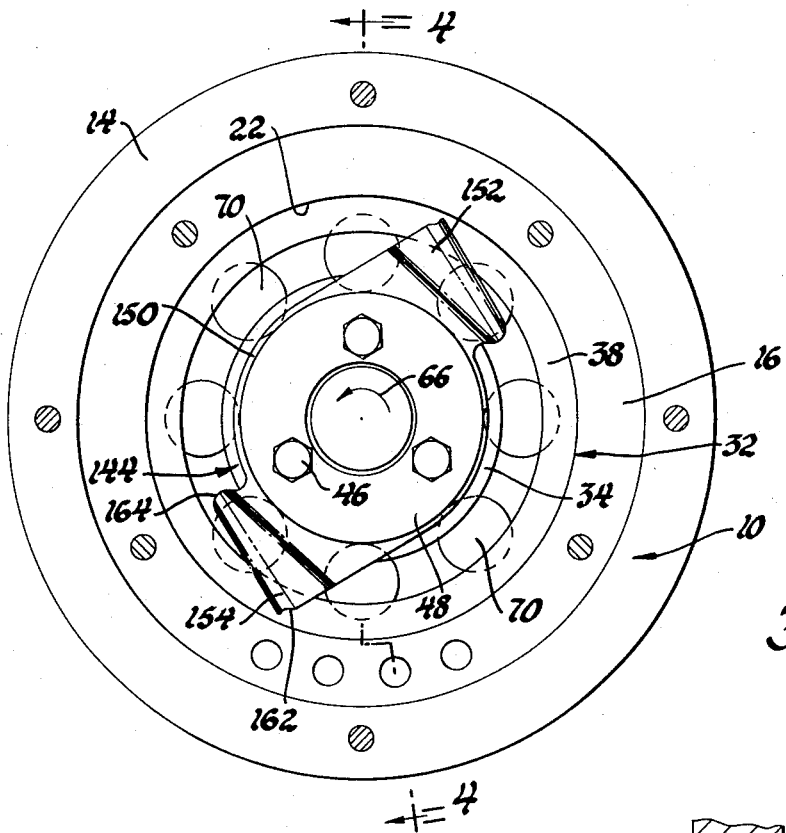
Fig. 3
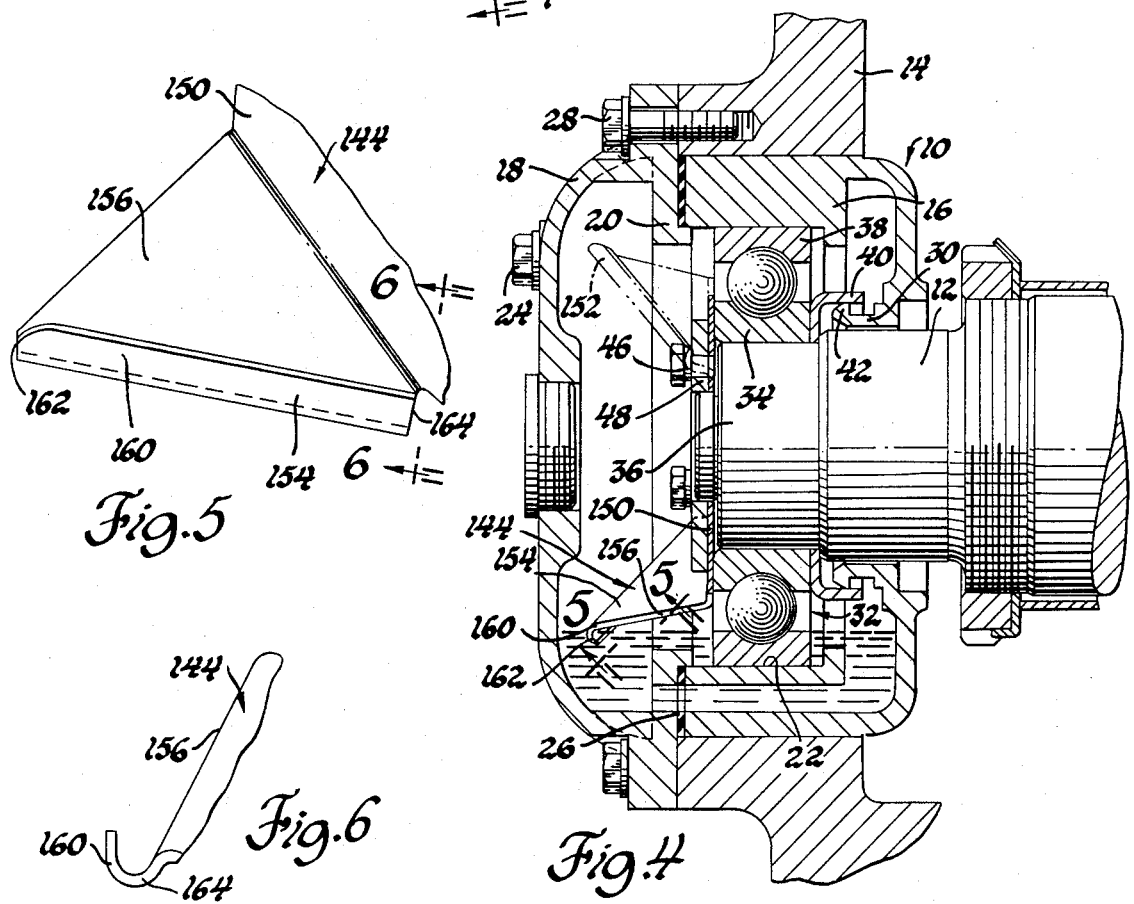
Fig. 5
Fig. 6
Fig. 4 the trailing edges and are flung therefrom continuously as the lubricator 44 is rotated.

It should also be noted that since my system tolerates lower oil levels in the sump it also permits a tilted orientation of the bearing journal box 10 with a slightly increased quantity of oil in the sump.

Referring now to FIGS. 3, 4, 5 and 6, there is shown a modified lubricator 144 in the bearing lubrication system in accordance with my invention. Except for the modified dynamic lubricator 144, the parts are identical to those illustrated in FIGS. 1 and 2 are are identified by the same numerals.

The modified dynamic lubricator 144 is also a stamped sheet metal part having a flat main body portion 150. The troughs 152 and 154 connected to the main body portion 150, however, are linear and diametrically opposed. Each of the troughs are identical so that the trough 154 only need be described.

The linear trough 154 is generally transversely disposed and is approximately U-shaped in cross section opening toward the bearing 32. The inner leg of the U-shaped trough 154 is continuous with a flat web 156 angled from the body 150. The outer leg of the U-shaped trough which merges from the rounded bottom of the trough forms an outer peripheral wall 160 which is slightly flared. See FIGS. 4 and 6.

The linear, generally transverse trough 154 is canted outwardly and forwardly in the direction of rotation indicated by the arrow 66 so that the leading edge 162 is displaced significantly ahead of the bearing 32 and further from its axis than the trailing edge 164. The modified lubricator provides all of the advantages of the previous lubricator and has the added advantage of a simpler construction in that each of the troughs is a simple gutter formed at the end of a flat web which precisely locates and orients the trough by a single angular bend where the web joins the main body.

In operation as the dynamic lubricator 144 is rotated, the leading edge 162 on the trough 154 dips into the oil and picks up a quantity of it which is then moved along the trough 154 through a combination of momentum, centrifugal force and screw action to the trailing edge 164 from whence the oil is flung off toward the bearing 32. The outer peripheral wall 160 being slightly flared increases the effects of centrifugal force on the oil just before it leaves the trough 154 and directs the oil toward the balls 70 preferably in the area where they contact the outer race 34.

The trough 152 functions in precisely the same manner so that each trough picks up some quantity of oil each revolution as it dips into the sump. These small quantities then migrate toward the trailing edges on the respective troughs and are flung therefrom continuously as the lubricator 144 is rotated.

I wish it to be understood that I do not desire to be limited to the exact details of construction shown and described, for obvious modifications will occur to a person skilled in the art.

I claim:

1. A bearing lubrication system comprising
a housing having a sump area in the internal bottom portion thereof filled with lubricant to a minimum acceptable level,
an antifriction bearing comprising an inner race, an outer race and an interposed complement of antifriction elements vertically disposed in said housing with said outer race mounted on an internal surface of said housing,
a rotor mounted on said inner race, and
a unitary sheet metal lubricator disposed in said housing comprising a flat radial body secured to said rotor in juxtaposition to said antifriction bearing, and a spiral shaped trough connected to said flat radial body by an open frustoconical web, said spiral shaped trough having a leading edge portion and a trailing edge portion disposed adjacent said antifriction elements, said leading edge portion being disposed so that it dips into said lubricant and delivers a quantity thereof to said trailing edge portion via said trough when said lubricator is rotated and said trailing edge portion being flared outwardly, circumferentially and radially so that it forms a throat in said trough immediately upstream of said trailing edge portion whereby said trailing edge portion directs said quantity of lubricant onto said antifriction elements with an increased centrifugal force.

2. A bearing lubrication system as defined in claim 1 wherein said lubricator has a plurality of troughs corresponding to said spiral shaped trough, said troughs being equally circumferentially spaced and separately connected to said flat radial body by discrete open frustoconical webs, and wherein said leading edge portion in each of said troughs is axially spaced from said trailing edge portion on each of said troughs by an equal amount.

3. A bearing lubrication system comprising
a housing having a sump area in the internal bottom portion thereof,
an antifriction bearing comprising an inner race, an outer race and an interposed complement of antifriction elements vertically disposed in said housing with said outer race mounted on an internal surface of said housing,
a rotor mounted on said inner race, and
a unitary sheet metal lubricator disposed in said housing and secured to said rotor in juxtaposition to said antifriction bearing, said lubricator having a plurality of circumferentially spaced, generally linear troughs, each of said troughs having a leading edge and a trailing edge spaced axially from and radially inward of said leading edge and disposed adjacent said antifriction elements, said leading edge being disposed so that when said sump area is filled with lubricant to a minimum acceptable level and said dynamic lubricator is rotated, said leading edge dips below said level whereby lubricant is picked at said leading edge and delivered to said antifriction elements from said trailing edge via said trough.

4. A bearing lubrication system comprising
a housing having a sump area in the internal bottom portion thereof,
an antifriction bearing comprising an inner race, an outer race and an interposed complement of antifriction elements vertically disposed in said housing with said outer race mounted on an internal surface of said housing,
a rotor mounted on said inner race, and
a unitary sheet metal lubricator disposed in said housing having a flat radial body secured to said rotor in juxtaposition to said antifriction bearing and a generally linear trough connected to said

BEARING LUBRICATION SYSTEM

My invention relates generally to a bearing lubrication system and more particularly to a bearing lubrication system of the oil bath type wherein oil is picked up from a sump and splashed onto the bearing when it is operating.

An object of my invention is to provide a bearing lubrication system of the oil bath type which has a minimum acceptable oil level for the sump which is lower than those heretofore required.

A further object of my invention is to provide a bearing lubrication system of the oil bath type which uses a simple stamped sheet metal dynamic lubricator for adequately lubricating from a sump located below the bearing.

Another object of my invention is to provide a bearing lubrication system of the oil bath type which accommodates an access to a sump which is significantly offset from the bearing.

Still another object of my invention is to provide a bearing lubrication system of the oil bath type which accommodates a tilted orientation of the bearing housing.

Yet another object of my invention is to provide a bearing lubrication system for lifting and feeding lubricant to a bearing from a low sump area through momentum and centrifugal force.

Yet a further object of my invention is to provide a bearing lubrication system for lifting and feeding lubricant to a bearing from a low offset sump area through momentum, centrifugal force and screw action.

Other objects and features of the invention will become apparent to those skilled in the art as the disclosure is made in the following detailed description of preferred embodiments of the invention as illustrated in the accompanying sheets of drawing in which:

In FIG. 1, the end cap of the bearing journal box has been removed to better illustrate the dynamic bearing lubricator used in the lubrication system.

FIG. 3 is a view similar to FIG. 1 illustrating a modified dynamic lubricator for use in a bearing lubrication system in accordance with my invention.

FIG. 4 is a view taken substantially along the line 4—4 of FIG. 3 but shows the end cap removed in FIG. 3.

FIG. 5 is a view taken substantially along the line 5—5 of FIG. 4.

FIG. 6 is a view taken substantially along the line 6—6 of FIG. 5.

Figure 2:
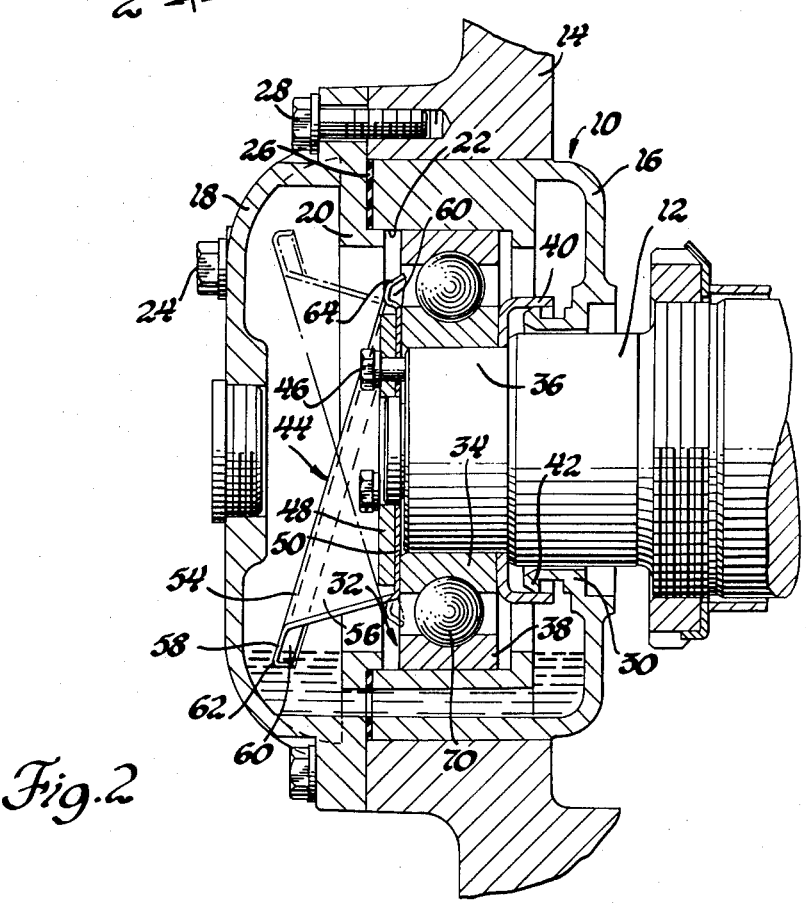
FIG. 2 is a section taken substantially along the line 2—2 of FIG. 1 but shows the end cap in place.

Referring now to the drawings and more specifically to FIG. 2, a bearing journal box 10 is disposed in the bore of a support 14. The journal box 10 comprises an end cap 18 having a circumferential L-shaped flange 20 piloted on an interior surface 22 of a housing 16. The end cap 18 is secured to the housing 16 by bolts 24 with the juncture between the housing 16 and the flange 20 sealed by a gasket 26. Bolts 28 in turn secure the end cap 18 to the support 14.

The journal box 10 receives the end of a rotor 12 through a central opening defined by an inturned axial flange 30 in the end wall of the housing 16. The end of the rotor 12 is journalled by a ball bearing 32 which has its outer race 38 mounted on the inner surface 22 of the housing 16 and its inner race 34 seated on the reduced end portion 36 of the rotor 12 disposed within the journal box 10. An angled metal ring 40 sandwiched between the inner race 34 and the shoulder formed by the reduced diameter portion 36 of the rotor 12 cooperates with a radial lip 42 on the flange 30 forming a labyrinth seal adjacent the housing opening.

A dynamic lubricator 44 is juxtaposed on the opposite side of inner race 34 and secured to the rotor 12 by bolts 46 extending through aligned apertures in an end plate 48 and the lubricator 44 and threadably received in the end of the rotor 12.

Figure 1:
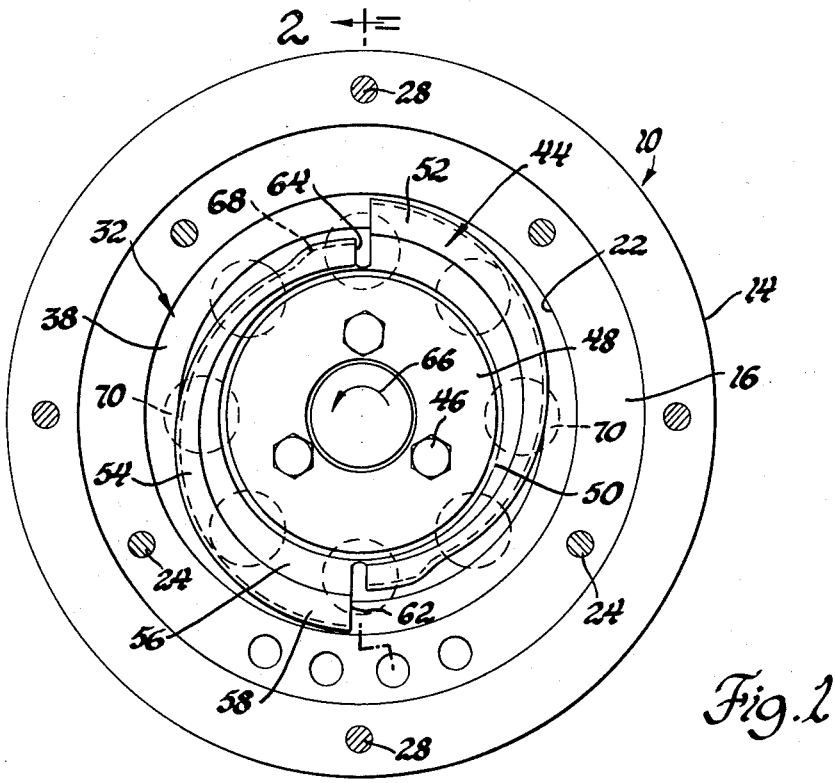
FIG. 1 is an elevation view of a bearing journal box having a bearing lubrication system in accordance with my invention.

Referring now to FIGS. 1 and 2, the dynamic lubricator 44 is a stamped sheet metal part having a flat main body portion 50 and two generally spiral troughs 52 and 54 connected to the main body portion 50 by a web 56. Each of the troughs extend approximately 180° circumferentially and are transverse to the rotor 12.

The trough 54 is canted as seen in FIG. 2 and includes a generally radial wall 58 connected to the web 56 and an outer peripheral wall 60 at the end of the radial wall 58 which turns back toward the bearing 32. The leading edge 62 of the trough 54 relative to the direction of rotation of the dynamic lubricator as indicated by the arrow 66 is at a greater radial distance from the center of the rotor 12 than the trailing edge 64. The trailing edge portion 68 of the trough 54 preferably flares slightly outwardly both circumferentially and radially. The trough 52 is identical to the trough 54.

The bottom area of the journal box 10 provides an oil sump. My lubrication system allows a lower minimum acceptable oil level in the sump because the lubricator 44 is able to pick up oil at a point which is at a greater radial distance than the point at which it is distributed to the bearing. FIG. 2 shows the sump area filled with oil at approximately the minimum acceptable level where it is seen that the level is displaced further from the axis of the rotor 12 than is the contact area of the balls with the outer race which is the maximum radius at which the oil can be distributed to the bearing for effective lubrication. Another advantage of my lubrication system is that it allows pick-up of the oil from a location which is significantly offset from the bearing 32 as for instance because of intervening structure such as the piloting flange 20.

In operation as the dynamic lubricator 44 is rotated, the leading edge 62 on the trough 54 (which is spaced axially from the bearing 32 and at a greater radial distance than the contact area of the balls 70 with the outer race 38) dips into the oil and picks up a quantity of it. The quantity of oil which is picked up is then moved along the trough 54 through a combination of momentum, centrifugal force and screw action to the trailing edge 64 from whence the oil is flung off toward the bearing 32. The trailing edge portion 68 is preferably flared circumferentially and radially to increase the effects of centrifugal force on the oil and direct its path of travel from the trailing edge 64 so that the oil reaches the balls 70 preferably in the area where they contact the outer race 34.

It is to be understood that the trough 52 functions in precisely the same manner and that each trough picks up some quantity of oil each revolution as it dips into the sump. These small quantities then migrate toward body by a flat triangularly shaped web, said trough having a leading edge and a trailing edge spaced axially from and radially inward of said leading edge and disposed adjacent said antifriction elements, said leading edge being disposed so that when said sump area is filled with lubricant to a minimum acceptable level and said dynamic lubricator is rotated, said leading edge dips below said level whereby lubricant is picked at said leading edge and delivered to said antifriction elements from said trailing edge via said trough.

5. A bearing lubrication system as defined in claim 4 wherein said lubricator has a plurality of troughs corresponding to said generally linear trough, said troughs being equally circumferentially spaced and separately connected to said flat radial body by discrete flat triangularly shaped webs, and wherein said leading edge portion in each of said troughs is axially spaced from said trailing edge portion on each of said troughs by an equal amount.

* * * * *